(12) United States Patent
Sim et al.

(10) Patent No.: US 8,396,499 B2
(45) Date of Patent: Mar. 12, 2013

(54) METHOD AND APPARATUS FOR MEASURING STATE OF PLURALITY OF CHANNELS AND FOR SELECTING IDLE CHANNEL

(75) Inventors: Dae-yong Sim, Suwon-si (KR); Ho-seok Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 13/108,556

(22) Filed: May 16, 2011

(65) Prior Publication Data

US 2011/0218008 A1      Sep. 8, 2011

Related U.S. Application Data

(62) Division of application No. 11/937,533, filed on Nov. 9, 2007, now Pat. No. 7,957,699.

(30) Foreign Application Priority Data

May 25, 2007   (KR) .................. 10-2007-0051000

(51) Int. Cl.
*H04W 72/10* (2009.01)
(52) U.S. Cl. ............... 455/512; 455/67.14; 455/115.2; 455/166.2; 370/252; 370/332
(58) Field of Classification Search .......... 455/512, 455/67.14, 67.11, 67.13, 67.15, 67.16, 115.1, 455/513, 452.2, 115.2, 115.3, 134, 135; 370/332, 370/389, 252, 253, 254, 341, 356, 229, 395.1; 714/704, 724; 340/438, 988
See application file for complete search history.

(56) References Cited

U.S. PATENT DOCUMENTS

| | | | | |
|---|---|---|---|---|
| 5,649,290 A | * | 7/1997 | Wang | 370/332 |
| 5,805,982 A | * | 9/1998 | Hulsebosch | 455/62 |
| 5,862,451 A | | 1/1999 | Grau et al. | |
| 5,887,259 A | | 3/1999 | Zicker et al. | |

(Continued)

FOREIGN PATENT DOCUMENTS

| | | |
|---|---|---|
| CN | 1225227 A | 8/1999 |
| CN | 1276114 A | 12/2000 |

(Continued)

OTHER PUBLICATIONS

Communication dated Dec. 31, 2012 issued by the State Intellectual Property Office of P.R. China in counterpart Chinese Patent Application No. 200810074105.6.

(Continued)

*Primary Examiner* — Tan Trinh
(74) *Attorney, Agent, or Firm* — Sughrue Mion, PLLC

(57) ABSTRACT

A method of measuring a state of a plurality of channels is provided. The method includes transmitting to a second device test signal information needed to transmit/receive a test signal for measuring the state of the plurality of channels; receiving an information received response from the second device, indicating that the second device has received the test signal; if the information received response is received, transmitting the test signal to the second device, using the test signal information, via the plurality of channels; and receiving from the second device the state information regarding the plurality of channels which has been measured by using the test signal.

11 Claims, 4 Drawing Sheets

U.S. PATENT DOCUMENTS

| | | | |
|---|---|---|---|
| 6,195,554 B1 * | 2/2001 | H'mimy et al. | 455/450 |
| 6,341,145 B1 | 1/2002 | Hioe et al. | |
| 6,442,151 B1 * | 8/2002 | H'mimy et al. | 370/333 |
| 6,542,747 B1 * | 4/2003 | Syukri | 455/450 |
| 7,092,837 B1 | 8/2006 | Lanier et al. | |
| 7,099,281 B1 | 8/2006 | Conway | |
| 7,213,257 B1 | 5/2007 | Emsley et al. | |
| 7,813,338 B2 | 10/2010 | Taylor et al. | |
| 8,089,888 B2 | 1/2012 | Krishnamurthi et al. | |
| 2003/0174813 A1 | 9/2003 | Mohammadian et al. | |
| 2004/0152422 A1 * | 8/2004 | Hoglund et al. | 455/67.11 |
| 2004/0208293 A1 | 10/2004 | Mohammadian et al. | |
| 2005/0086563 A1 | 4/2005 | Carballo | |
| 2006/0132299 A1 | 6/2006 | Mansfield et al. | |
| 2010/0039955 A1 | 2/2010 | Taylor et al. | |

FOREIGN PATENT DOCUMENTS

| | | | |
|---|---|---|---|
| CN | 1871862 A | | 11/2006 |
| EP | 0953267 B1 | | 5/2006 |
| JP | 10257097 A | | 9/1998 |
| JP | 2005512473 A | | 4/2005 |
| KR | 10-1999-0002838 A | | 1/1999 |
| WO | 9802010 A1 | | 1/1998 |

OTHER PUBLICATIONS

Communication dated Nov. 13, 2012 issued by the Japanese Patent Office in counterpart Japanese Patent Application No. 2008-105785.

* cited by examiner

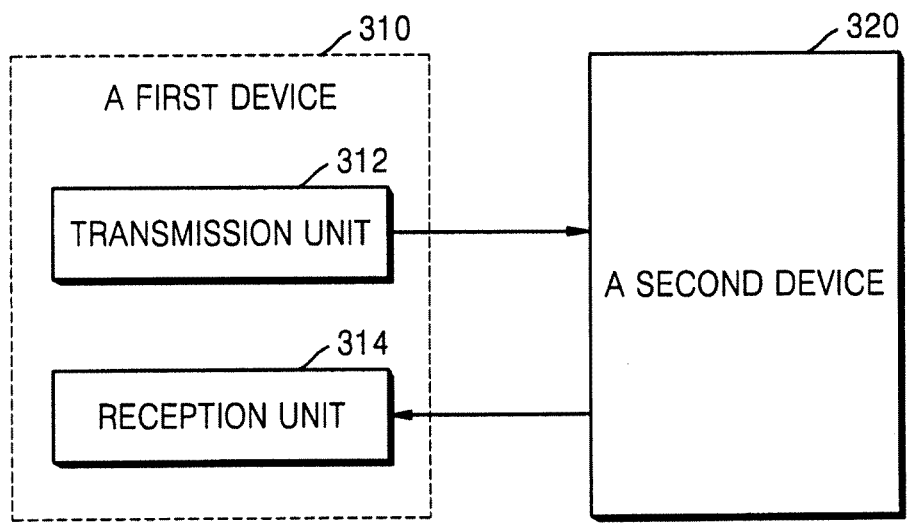

|  | PREFERENCE 1 | PREFERENCE 2 | PREFERENCE 3 | PREFERENCE 4 |
|---|---|---|---|---|
| TERMINAL 1 | ch.41 | ch.29 | ch.23 | ch.37 |
| TERMINAL 2 | ch.29 | ch.23 | ch.37 | ch.41 |
| TERMINAL 3 | ch.23 | ch.41 | ch.37 | ch.29 |

METHOD AND APPARATUS FOR MEASURING STATE OF PLURALITY OF CHANNELS AND FOR SELECTING IDLE CHANNEL

CROSS-REFERENCE TO RELATED PATENT APPLICATION

This is a divisional of application Ser. No. 11/937,533 filed Nov. 9, 2007, which priority from Korean Patent Application No. 10-2007-0051000, filed on May 25, 2007, in the Korean Intellectual Property Office. The entire disclosure of the prior applications are considered part of the disclosure of the accompanying divisional application and are hereby incorporated by reference.

BACKGROUND

1. Technical Field

Methods and apparatuses consistent with the present invention relate to measuring a state of a plurality of channels and selecting an idle channel.

2. Description of the Related Art

A cognitive radio technology determines a current state of a channel according to a region and time, and based on the determination, selects an appropriate frequency, modulation, and an output, so as to communicate, dynamically moving an idle channel in real time. A technology related to such cognitive radio technology has been actively developed so as to use limited frequency sources.

In order to induct such technology, which efficiently uses the idle channel, into an ultra high frequency (UHF) band, a technology capable of rapidly detecting a primary user (e.g. a sky wave channel) that has a priority of use of a channel, and capable of communicating between devices which are not the primary user, by using the idle channel that is a channel not used by the primary user, becomes an important technology.

FIG. 1 is a diagram illustrating a conventional method of scanning a channel state.

In operation 110, a base station transmits to a terminal a channel state scanning request for scanning the channel state.

In operation 120, the terminal transmits to the base station a request received response indicating that the terminal has received the channel state scanning request.

At this time, if the base station does not receive the request received response, the base station again transmits the channel state scanning request to the terminal.

In operation 130, the terminal reports to the base station the channel state scanned according to the channel state scanning request.

In operation 140, the base station transmits to the terminal a report received response indicating that the base station has received the channel state report from the terminal.

At this time, if the terminal does not receive the report received response, the terminal again reports the channel state to the base station.

Here, the base station receives the report including information regarding communication quality of the channel, and whether the channel is in use.

However, the conventional method has problems in that the conventional method does not provide a specific method of measuring communication quality of a plurality of channels, and when the base station and the terminal select an idle channel from among a plurality of idle channels so as to perform communication, the conventional method does not consider a location of a terminal, an application, or the like.

SUMMARY

Aspects of the present invention provide a method and apparatus for measuring a state of a plurality of channels which measure communication quality of the plurality of channels.

Aspects of the present invention also provide a method and apparatus for selecting an idle channel from among a plurality of idle channels by which a base station and a terminal can perform communication efficiently.

According to an aspect of the present invention, there is provided a method of measuring a state of a plurality of channels capable of being used in communication between a first device and a second device, the method including: transmitting test signal information that is information needed to transmit and receive a test signal for measuring the state of the plurality of channels, to the second device; receiving an information received response from the second device, indicating that the second device has received the test signal information; transmitting the test signal based on the test signal information to the second device via the plurality of channels, if the information received response is received; and receiving state information regarding the plurality of channels, which has been measured by using the test signal, from the second device.

The method of measuring the state of the plurality of channels capable of being used in the communication between the first device and the second device may include the operation of scanning idle channels from among all channels, wherein the plurality of channels may be the scanned idle channels.

The method of measuring the state of the plurality of channels capable of being used in the communication between the first device and the second device may further include the operations of transmitting a channel state measurement start request for starting to measure the state of the plurality of channels, to the second device; and receiving the start request received response indicating that the channel state measurement start request is received. If the start request received response is received, the operation of transmitting the test signal may transmit the test signal information to the second device.

The test signal information may include a test signal transmission period that is the time required after a predetermined channel has transmitted the test signal until another channel again transmits the test signal, a start channel number that is the channel to be used to initially transmit the test signal, and an end channel number that is the channel to be used to finally transmit the test signal.

The state information regarding the plurality of channels is generated by calculating a signal-to-noise ratio from the test signals which have been received via the respective channels of the plurality of channels.

The state information regarding the plurality of channels comprises values obtained by denoting, numerically, respective communication qualities of the plurality of channels, and by then normalizing values of the respective communication qualities that have been denoted numerically.

According to another aspect of the present invention, there is provided a method of selecting an idle channel from among a plurality of idle channels for communication between a first device and a plurality of second devices, the method comprising: setting a priority for respective idle channels from among the plurality of idle channels, using at least one of distance information regarding a distance between the first device and the respective second devices, preference information for an idle channel of the respective second devices and application information regarding an application provided by the respective second devices; and selecting the idle channel for communication with the plurality of second devices using the set priority.

The operation of setting the priority may set the priority based on a database storing at least one of the distance information regarding the distance between the first device and the second device, the preference information for the idle channel of the second device, and the application information regarding the application provided by the second device.

The operation of setting the priority may set one of the respective idle channels to have a high priority, if the one of the respective idle channels is preferred by the second device that provides a more important application from among the plurality of second devices and the third device.

The operation of setting the priority may set one of the respective idle channels to have a high priority, if the one of the respective idle channels is preferred by the second device that is located farthest from the first device from among the plurality of second devices. Preference information regarding the idle channel of the second device is information generated based on a priority for the plurality of idle channels, wherein the priority is generated according to communication quality measured for the respective idle channels of the plurality of channels by the second device.

According to another aspect of the present invention, there is provided an apparatus for measuring a state of a plurality of channels capable of being used in a communication between a first device and a second device, the apparatus including: a transmission unit transmitting test signal information that is information needed to transmit and receive a test signal for measuring the state of the plurality of channels, to the second device; and a reception unit receiving an information received response from the second device, indicating that the second device has received the test signal information. The transmission unit transmits the test signal based on the test signal information to the second device via the plurality of channels, if the information received response is received; and the reception unit receives state information for the plurality of channels which has been measured by using the test signal, from the second device.

The apparatus for measuring the state of the plurality of channels capable of being used in the communication between the first device and the second device may further include an idle channel scan unit scanning idle channels from among all channels, wherein the plurality of channels are the idle channels scanned by the idle channel scan unit.

According to another aspect of the present invention, there is provided an apparatus for selecting an idle channel from among a plurality of idle channels for communication between a first device and a plurality of second devices, the apparatus comprising: a priority set unit which sets a priority for respective idle channels from among the plurality of idle channels, using at least one of distance information regarding a distance between the first device and the respective second devices, preference information for an idle channel of the respective second devices and application information regarding an application provided by the respective second devices; and a channel selection unit which selects the idle channel for communication with the plurality of second devices using the set priority. According to another aspect of the present invention, there is provided a computer readable recording medium storing a computer readable program for executing a method of measuring a state of a plurality of channels capable of being used in communication between a first device and a second device, the method including: transmitting test signal information that is information needed to transmit and receive a test signal for measuring the state of the plurality of channels, to the second device; receiving an information received response from the second device, indicating that the second device has received the test signal information; transmitting the test signal based on the test signal information to the second device via the plurality of channels, if the information received response is received; and receiving state information on the plurality of channels, which has been measured by using the test signal, from the second device.

According to another aspect of the present invention, there is provided a computer readable recording medium storing a computer readable program for executing a method of selecting an idle channel from among a plurality of idle channels for communication between a first device and a plurality of second devices, the method comprising: setting a priority for respective idle channels from among the plurality of idle channels, using at least one of distance information regarding a distance between the first device and the respective second devices, preference information for an idle channel of the respective second devices and application information regarding an application provided by the respective second devices; and selecting the idle channel for communication with the plurality of second devices using the set priority.

BRIEF DESCRIPTION OF THE DRAWINGS

The above and other aspects of the present invention will become more apparent by describing in detail exemplary embodiments thereof with reference to the attached drawings, in which:

FIG. 3 is a block diagram of an apparatus for measuring a state of a plurality of channels according to another exemplary embodiment of the present invention;

FIG. 4 is a diagram illustrating state information regarding channels according to another exemplary embodiment of the present invention;

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
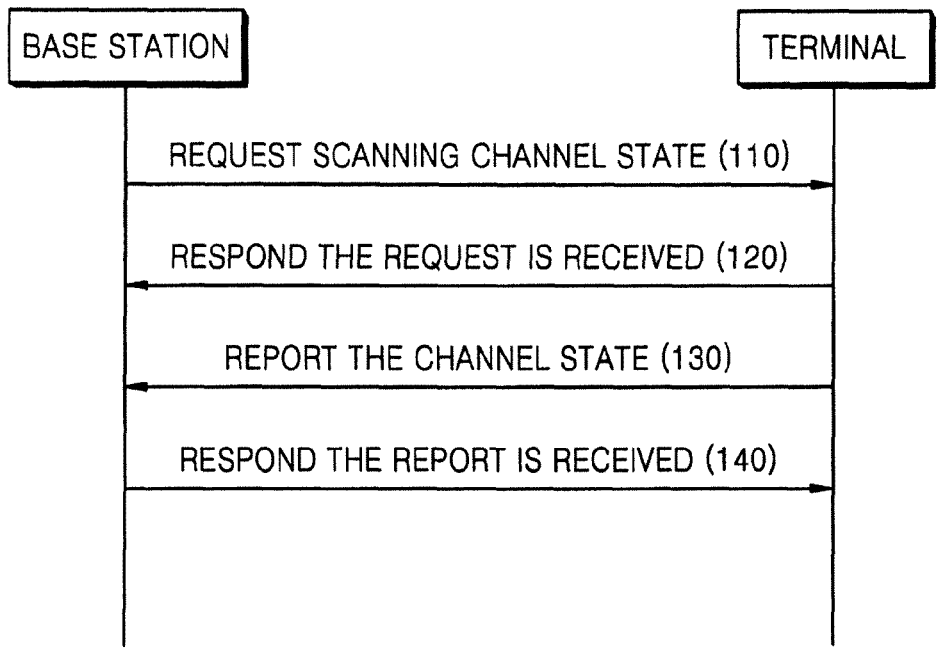
FIG. 1 is a diagram illustrating a conventional method of scanning a channel state.
Figure 2:
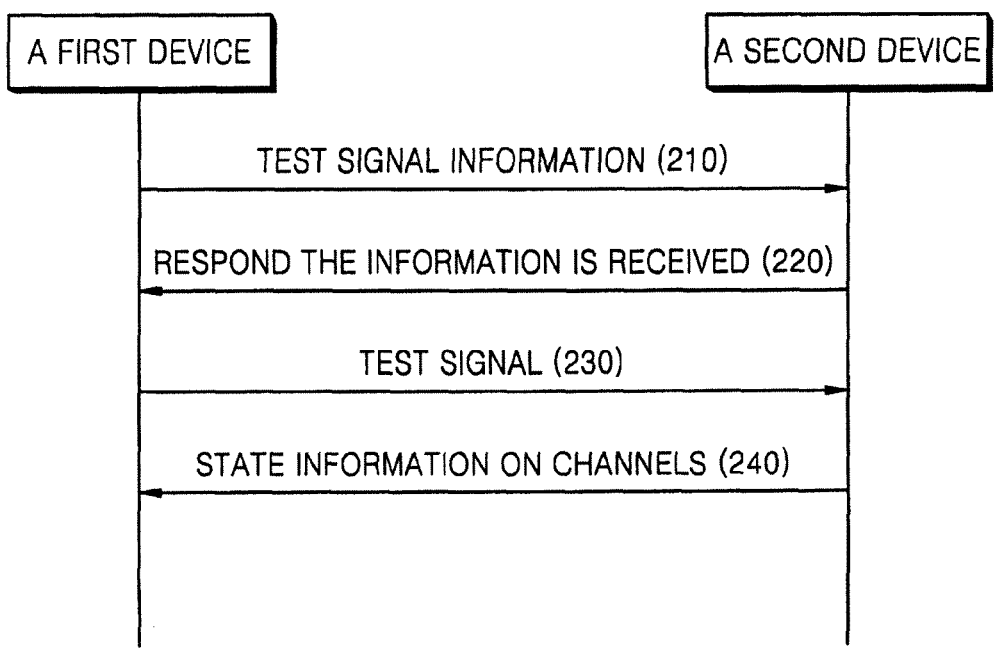
FIG. 2 is a diagram illustrating a method of measuring a state of a plurality of channels according to an exemplary embodiment of the present invention.

FIG. 2 is a diagram illustrating a method of measuring a state of a plurality of channels according to an exemplary embodiment of the present invention.

In operation 210, a first device transmits test signal information that is information needed to transmit/receive a test signal for measuring the state of the plurality of channels, to a second device.

According to the exemplary embodiment of FIG. 2, the test signal information may include a test signal transmission period that is the time required after a predetermined channel has transmitted the test signal until another channel again transmits the test signal, a start channel number that is the channel to be used to initially transmit the test signal, and an end channel number that is the channel to be used to finally transmit the test signal.

However, according to other exemplary embodiments, operation 210 may further include the operation of transmitting in which the first device transmits a channel state measurement start request to the second device requiring starting to measure a state of a plurality of channels and the operation of receiving in which the first device receives a start request received response indicating that the second device has received the channel state measurement start request.

According to the exemplary embodiment of FIG. 2, the plurality of channels may be a plurality of idle channels, and in this case, operation 210 may further include the operation of scanning the idle channels from among all channels.

That is, exemplary embodiments of the present invention may not only measure a channel state of a plurality of channels determined by a user but also a channel state of idle channels.

Further, the first device may be a base station or a set-top box, and the second device may be a terminal. According to the exemplary embodiment of FIG. 2, the terminal denotes all devices capable of communicating with the first device, such as a digital television (DTV), a portable multimedia player (PMP), an MPEG Audio Layer-3 (MP3) player, a notebook, a mobile phone, or the like.

In operation 220, the first device receives an information received response from the second device, indicating that the second device has received the test signal information.

In operation 230, if the information received response is received, the first device transmits the test signal based on the test signal information to the second device via the plurality of channels.

According to the exemplary embodiment of FIG. 2, if the information received response is not received, the first device does not transmit the test signal but instead transmits the test signal information to the second device again.

In operation 240, the first device receives state information regarding the plurality of channels, which has been measured by using the test signal, from the second device.

According to the exemplary embodiment of FIG. 2, the state information regarding the plurality of channels may be generated by calculating a signal-to-noise ratio from the test signals which the second device has received via the respective channels of the plurality of channels.

Also, the state information on the plurality of channels may be formed of values obtained by denoting numerically respective communication qualities of the plurality of channels, and by then normalizing values of the respective communication qualities that have been denoted numerically.

FIG. 3 is a block diagram of an apparatus for measuring a state of a plurality of channels according to another exemplary embodiment of the present invention.

Referring to FIG. 3, a first device 310 that is the apparatus for measuring the state of the plurality of channels includes a transmission unit 312, and a reception unit 314.

The transmission unit 312 transmits test signal information that is information needed to transmit/receive a test signal for measuring the state of the plurality of channels, to a second device 320.

The reception unit 314 receives an information received response from the second device 320, indicating that the second device 320 has received the test signal information.

In this way, when the information received response is received by the reception unit 314, the transmission unit 312 transmits the test signal based on the test signal information to the second device 320 via the plurality of channels.

Finally, the reception unit 314 receives state information regarding the plurality of channels which has been measured by using the test signal, from the second device 320.

FIG. 4 is a diagram illustrating state information regarding channels according to another exemplary embodiment of the present invention.

FIG. 4 is a diagram showing the results when a terminal '1', a terminal '2', and a terminal '3' have measured communication qualities of idle channels '23', '29', '37', and '41'.

Referring to FIG. 4, the communication qualities of the respective channels are denoted by using a value in the range of 1 through 10. The worst communication quality is denoted as 1, and the best communication quality is denoted as 10.

Meanwhile, according to a good/bad quality of the measured communication quality, preferred channel information for the respective terminals may be obtained.

Figures 5, 6:
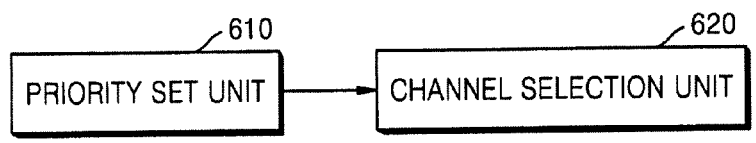
FIG. 5 is a diagram illustrating preference information regarding channels according to another exemplary embodiment of the present invention.
FIG. 6 is a block diagram of an idle channel selection apparatus according to another exemplary embodiment of the present invention.

FIG. 5 is a diagram illustrating preference information regarding channels according to another exemplary embodiment of the present invention.

Referring to FIG. 5, a list of channels preferred by respective terminals 1 through 3 is shown in order of preference of the terminals.

For example, terminal '1' prefers a channel '41' the most, and seldom prefers channel '37'.

The preference for the channels is generated based on the communication qualities that have been measured for the respective channels from among the plurality of channels by the respective terminals, as shown in FIG. 3.

An exemplary method of measuring the state of the plurality of channels is described above.

An exemplary method of selecting a channel from among a plurality of idle channels, by using the preference information for the channels will now be described.

FIG. 6 is a block diagram of an idle channel selection apparatus according to another exemplary embodiment of the present invention.

Referring to FIG. 6, the idle channel selection apparatus includes a priority set unit 610, and a channel selection unit 620.

The priority set unit 610 sets the priority for the respective idle channels of the plurality of idle channels, based on at least one of distance information regarding the distance between the idle channel selection apparatus and a terminal, preference information regarding an idle channel of the terminal, and application information regarding the application provided by the terminal.

According to the exemplary embodiment shown in FIG. 6, the terminal denotes all devices capable of communicating with the idle channel selection apparatus, such as a DTV, a PMP, an MP3 player, a notebook, a mobile phone, or the like.

Also, the priority set unit 610 may set the priority for the respective idle channels of the plurality of idle channels, based on a database storing the distance information regarding the distance between the idle channel selection apparatus and the terminal, the preference information regarding the idle channel of the terminal, and the application information regarding the application provided by the terminal.

The operation of the priority set unit 610 will be described more specifically in relation to FIG. 7.

Based on the priority set in the priority set unit 610, the channel selection unit 620 selects the idle channel from among the plurality of idle channels. The selected idle channel is to be used in communication with the terminal.

That is, according to results set in the priority set unit 610, the channel selection unit 620 selects the idle channel having a top priority, as the idle channel to be used in the communication with the terminal.

However, when the idle channel having the top priority cannot be used, the channel selection unit 620 selects the idle channel having a second top priority.

A method of setting a priority for an idle channel will now be described in relation to FIG. 7.

Figure 7:
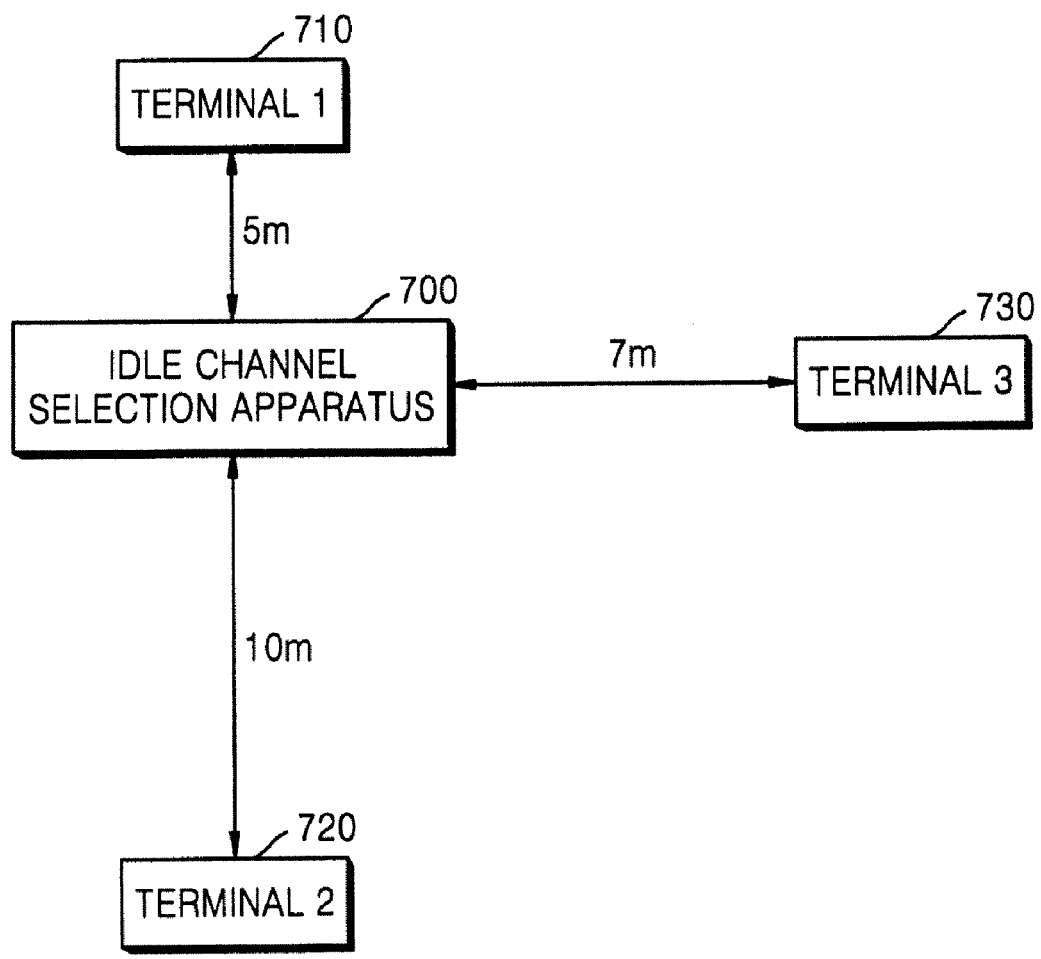
FIG. 7 is a block diagram of a method of setting the priority for the idle channel according to another exemplary embodiment of the present invention.

FIG. 7 is a block diagram of the method of setting the priority for the idle channel according to another exemplary embodiment of the present invention.

In FIG. 7, an idle channel selection apparatus 700, and terminals 710, 720, and 730 for performing communication with the idle channel selection apparatus 700, are illustrated.

According to the exemplary embodiment shown in FIG. 7, the terminals 710, 720, and 730 are located away from the idle channel selection apparatus 700 at predetermined distances. The terminal '1' 710, the terminal '2' 720, and the terminal '3' 730 are respectively 5 meters, 10 meters, and 7 meters away from the idle channel selection apparatus 700.

In the case of the plural terminals shown in FIG. 7, when the idle channel selection apparatus 700 selects the idle channel that is to be used in the communication with the terminals 710, 720, and 730, the idle channel selection apparatus 700 considers primarily the idle channels which are preferred by the terminal located farthest from the idle channel selection apparatus 700, from among the plurality of terminals 710, 720, and 730.

For example, the terminal '2' 720 is located farthest from the idle channel selection apparatus 700 as shown in FIG. 7. Thus, the idle channel selection apparatus 700 primarily considers a preference for the idle channel of the terminal '2' 720 over a preference for the idle channels of the terminals 710, and 730.

That is, according to the preference for the idle channel of the terminal '2' 720, the idle channel selection apparatus 700 determines a priority of the idle channels that are to be used in the communication with the terminals 710, 720, and 730.

Referring to FIG. 5, the priority for the idle channels of the terminal '2' 720 is determined sequentially from a channel '29', a channel '23', a channel '37', and a channel '41'. Hence, in the aforementioned example, the idle channel selection apparatus 700 determines the priority of the idle channels sequentially from channel '29', channel '23', channel '37', and channel '41'.

Moreover, the respective terminals 710, 720, and 730 may provide respectively different kinds of applications.

In the case of the plural terminals shown in FIG. 7, when the idle channel selection apparatus 700 selects the idle channel that is to be used in the communication with the terminals 710, 720, and 730, the idle channel selection apparatus 700 primarily considers idle channels preferred by the terminal which provides a more important application, from among the plurality of terminals 710, 720, and 730.

In the case where the respective terminals 710, 720, and 730 provide different kinds of applications, the idle channels preferred by the terminal which provides the more important application among the terminals 710, 720, and 730, are set to have a high priority.

For example, the terminal '1' 710, the terminal '2' 720, and the terminal '3' 730 may be, respectively, a high definition television (HDTV), a standard definition television (SDTV), and an audio player.

In this case, a priority of the application may be determined sequentially from the HDTV, the SDTV, and the audio player. In the case where the priority of the application is determined in this manner, the idle channel selection apparatus 700 determines a priority of the idle channels that are to be used between the idle channel selection apparatus 700 and the terminals 710, 720, and 730, according to a preference for the idle channel of the terminal '1' 710.

Referring to FIG. 5, the priority of the idle channels preferred by the terminal '1' 710 is set sequentially from a channel '41', a channel '29', a channel '23', and a channel '37'. Thus, in the above example, the idle channel selection apparatus 700 determines the priority of the idle channels sequentially from channel '41', channel '29', channel '23', and channel '37'.

Also, in determining the priority of the idle channel, information regarding an application provided by a terminal is considered to be more primary than information regarding a distance between terminals.

For example, in FIG. 7, since the terminal '2' 720 is located farther from the idle channel selection apparatus 700 than the terminal '1' 710, basically, the idle channel selection apparatus 700 has to determine the priority of the idle channel that is to be used in the communication with a terminal, according to the preference for the idle channel of the terminal '2' 720. However, in the case where the terminal '1' 710 provides a more important application than the terminal '2' 720, the idle channel selection apparatus 700 determines the priority of the idle channel that is to be used in the communication with the terminals, according to the preference for the idle channel of the terminal '1' 710.

Exemplary embodiments of the present invention can transmit the test signal information needed to transmit/receive the test signal for measuring the state of the plurality of channels, to the second device, and receive the information received response from the second device, indicating that the second device has received the test signal. If the information received response is received, exemplary embodiments of the present invention can transmit the test signal based on the test signal information to the second device via the plurality of channels, and receive the state information regarding the plurality of channels which has been measured by using the test signal, from the second device. Accordingly, the communication quality of the plurality of channels can be measured.

Also, exemplary embodiments of the present invention can select the idle channel from among the plurality of idle channels, by which a base station and terminal effectively perform communication.

The exemplary embodiments of the present invention can be written as computer programs and can be implemented in general-use digital computers that execute the programs using a computer readable recording medium. Examples of such a computer readable recording medium include, but are not limited to, magnetic storage media (e.g., ROM, floppy disks, hard disks, etc.), optical recording media (e.g., CD-ROMs, or DVDs), and storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the exemplary embodiments of invention but by the appended claims, and all differences within the scope will be construed as being included in the present invention.

What is claimed is:

1. A method of selecting an idle channel from among a plurality of idle channels for communication between a first device and a plurality of second devices, the method comprising:
    setting a priority for respective idle channels from among the plurality of idle channels, using at least one of:
        distance information regarding a distance between the first device and the respective second devices;
        preference information for an idle channel of the respective second devices; and
        application information regarding an application provided by the respective second devices; and
    selecting the idle channel for communication with the plurality of second devices using the set priority.

2. The method of claim 1, wherein the setting of the priority comprises:
    setting the priority using a database storing at least one of:
        the distance information regarding the distance between the first device and the second device,
        the preference information for the idle channel of the second device, and
        the application information regarding the application provided by the second device.

3. The method of claim 1, wherein the setting of the priority comprises setting one of the respective idle channels to have a high priority, if the one of the respective idle channels is preferred by the second device that provides a more important application from among the plurality of second devices and the third device.

4. The method of claim 1, wherein the setting of the priority comprises setting one of the respective idle channels to have a high priority, if the one of the respective idle channels is preferred by the second device that is located farthest from the first device from among the plurality of second devices.

5. The method of claim 1, wherein preference information regarding a preferred idle channel of the second device comprises information generated using a priority for each of the plurality of idle channels,
    wherein the priority for each of the plurality of idle channels is generated according to communication quality measured for the respective idle channel by the second device.

6. A computer readable recording medium having recorded thereon a program for executing the method of claim 1.

7. An apparatus for selecting an idle channel from among a plurality of idle channels for communication between a first device and a plurality of second devices, the apparatus comprising:
    a priority set unit which sets a priority for respective idle channels from among the plurality of idle channels, using at least one of:
        distance information regarding a distance between the first device and the respective second devices;
        preference information for an idle channel of the respective second devices; and
        application information regarding an application provided by the respective second devices; and
    a channel selection unit which selects the idle channel for communication with the plurality of second devices using the set priority.

8. The apparatus of claim 7, wherein the priority set unit sets the priority using a database storing at least one of:
    the distance information regarding the distance between the first device and the second device,
    the preference information for the idle channel of the second device, and
    the application information regarding the application provided by the second device.

9. The apparatus of claim 7, wherein the priority set unit sets one of the respective idle channels to have a high priority, if the one of the respective idle channels is preferred by one of the second device and the third device that provides a more important application from among the plurality of second devices and the third device.

10. The apparatus of claim 7,
    wherein the priority set unit sets one of the respective idle channels to have a high priority, if the one of the respective idle channels is preferred by one of the second device and the third device that is located farthest from the first device from among the plurality of second devices and the third device.

11. The apparatus of claim 7, wherein preference information regarding a preferred idle channel of the second device comprises information generated using a priority for each of the plurality of idle channels,
    wherein the priority for each of the plurality of idle channels is generated according to communication quality measured for the respective idle channel by the second device.

* * * * *